Nov. 7, 1939.　　　　T. M. McDONALD　　　　2,179,418
ELECTRIC BICYCLE
Filed May 12, 1938　　　3 Sheets-Sheet 1
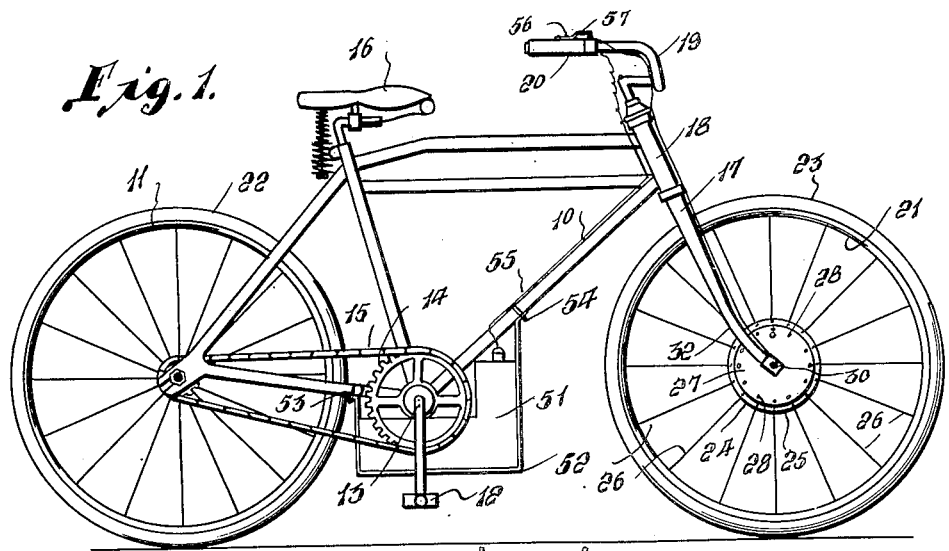
Fig. 1.
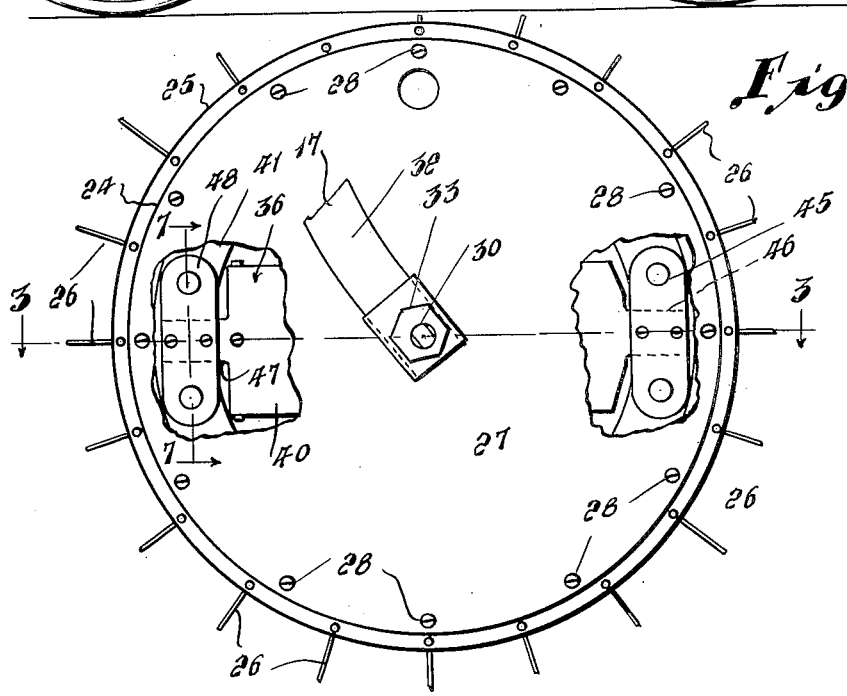
Fig. 2.
Fig. 9.
Inventor
T. M. McDonald
By L. F. Randulph
Attorney

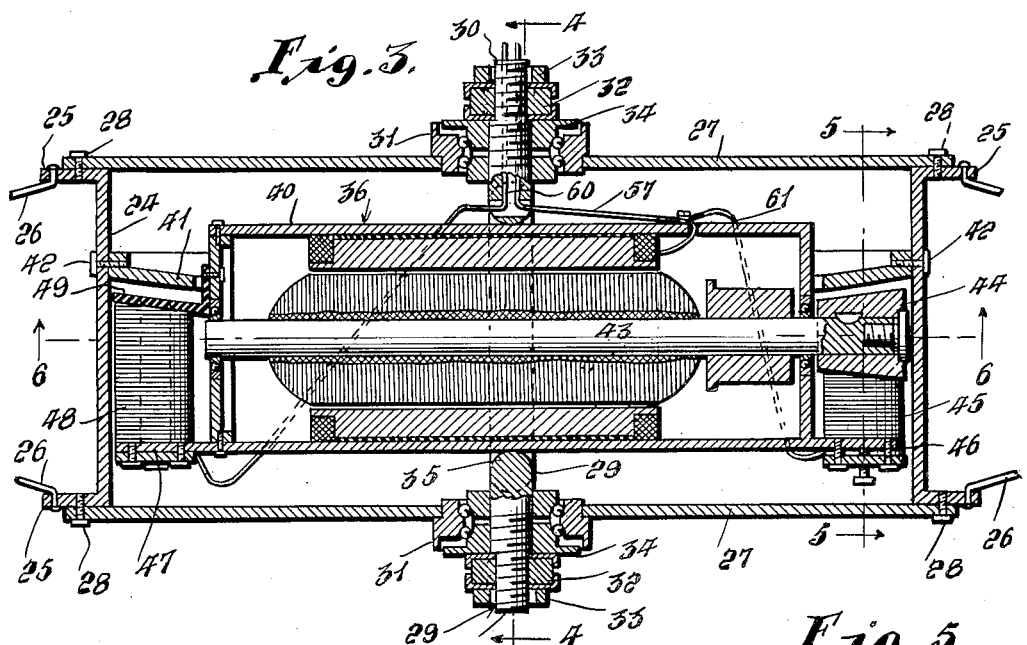
Fig. 3.
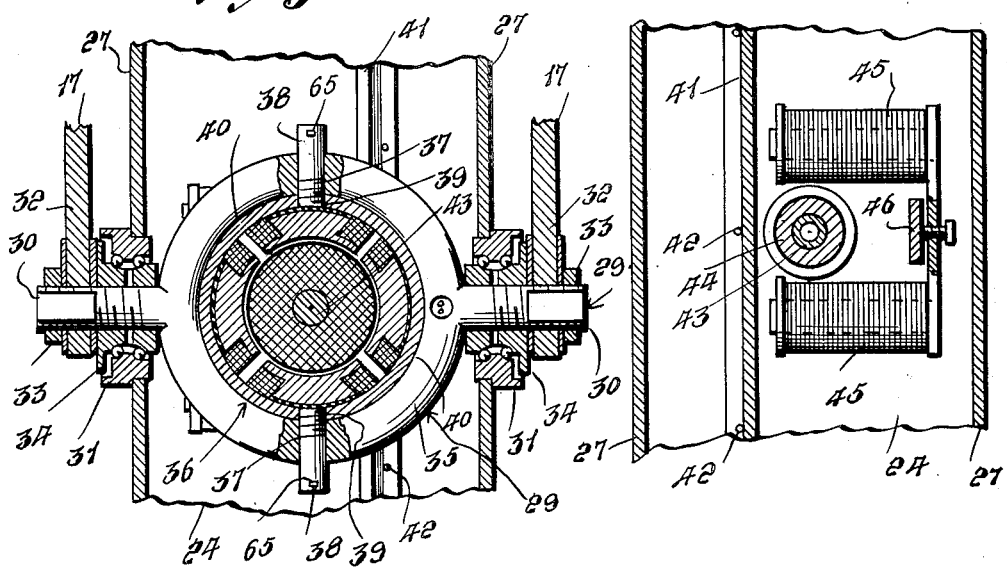
Fig. 4.
Fig. 5.
Inventor
T. M. McDonald

Nov. 7, 1939.  T. M. McDONALD  2,179,418
ELECTRIC BICYCLE
Filed May 12, 1938   3 Sheets-Sheet 3

Inventor
T. M. McDonald
By L. F. Randolph
Attorney

Patented Nov. 7, 1939

2,179,418

UNITED STATES PATENT OFFICE 2,179,418

ELECTRIC BICYCLE

Thomas M. McDonald, St. Ignatius, Mont.

Application May 12, 1938, Serial No. 207,631

6 Claims. (Cl. 172—287)

This invention relates to a bicycle and it aims to provide means electrically operable to rotate or propel the front wheel of the bicycle, so that the bicycle will thus be operable by power.

It is further aimed to provide such a bicycle, capable of operation by power alone and also capable of operation selectively, by the usual foot propulsion means.

In addition, it is aimed to provide a novel electric motor and mounting in connection with the front wheel of the bicycle, and novel means whereby the motor is maintained in gear with the front wheel or in braked relation, and is further normally maintained in a neutral position.

The more specific objects and advantages will become apparent from a consideration of the description following taken in connection with accompanying drawings illustrating an operative embodiment.

In said drawings:

Figure 1 is a view in front elevation of a bicycle constructed in accordance with the invention;

Figure 2 is an enlarged side elevation, partly broken away, of the electric motor means used in connection with the front wheel;

Figure 3 is a horizontal cross section taken on the plane of line 3—3 of Figure 2;

Figure 4 is a vertical cross section taken on the plane of line 4—4 of Figure 3;

Figure 5 is a vertical sectional view taken on the plane of line 5—5 of Figure 3;

Figure 9 is a longitudinal sectional view taken on the line 9—9 of Figure 8.

Figure 6:
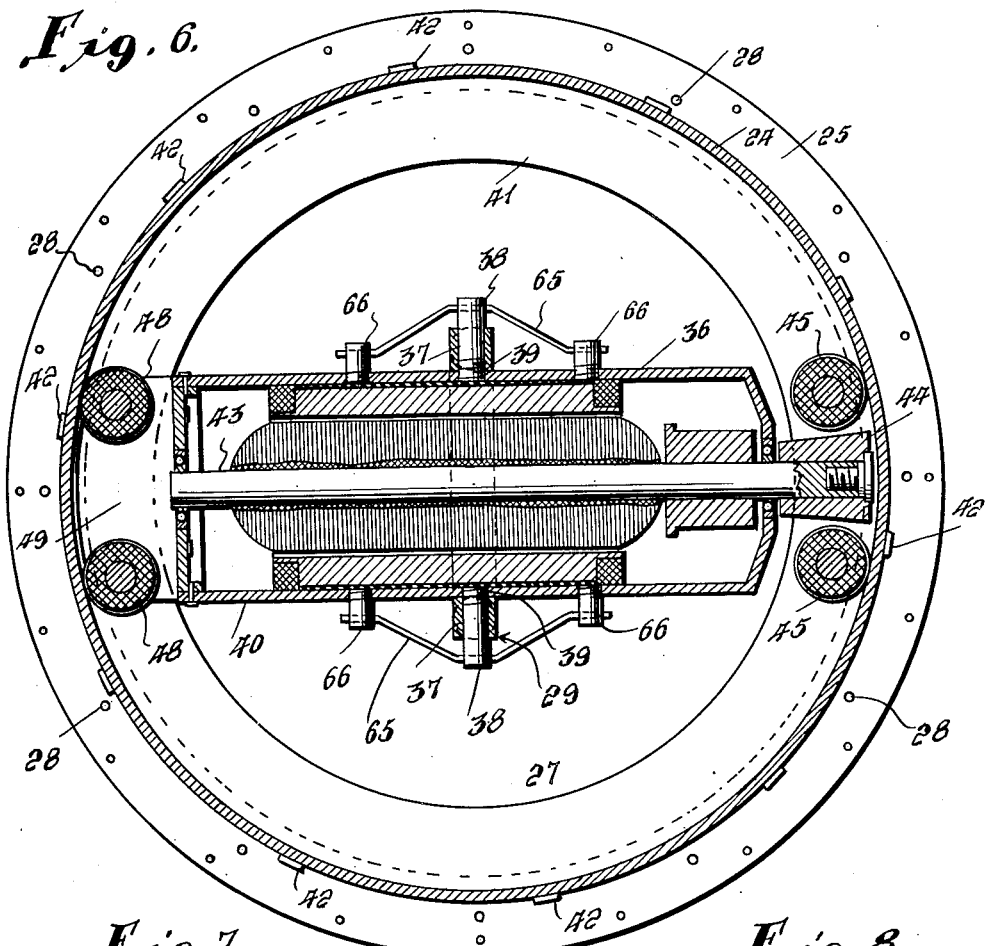
Figure 6 is a vertical section taken on the plane of line 6—6 of Figure 3.
Figure 7:
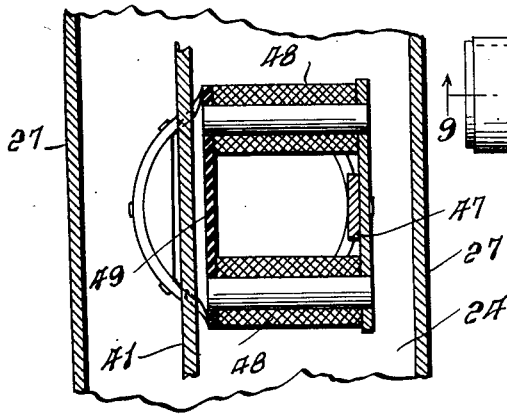
Figure 7 is a detail section taken on the line 7—7 of Figure 2.

Referring specifically to the drawings wherein like reference characters designate like or similar parts, the bicycle is generally of conventional form, having a frame 10, in which a rear wheel 11 is mounted and adapted to be propelled through the operation of usual pedals 12 on a crank 13, having a sprocket wheel 14 thereon traversed by a sprocket chain 15, to impart rotation to the rear wheel 11. Such rear wheel preferably has a coaster brake, whereby, pedals 12 need not be operated and the wheel 11 may coast or turn without propulsion. A usual seat is employed at 16. A front fork 17 is journaled in the tube 18 of the frame and associated with the fork is a handle bar 19 preferably equipped at the terminals with rubber or other hand grips 20.

The front wheel is shown at 21 and removably mounted in the fork 17. Both of the wheels 11 and 21 are preferably equipped with pneumatic tires as at 22 and 23, respectively.

Said wheel 21 has a relatively large cylindrical hub member 24 with radially extending flanges 25 at opposite ends thereof to which the spokes 26 are fastened. Plates 27 are removably secured to the flanges 25 as by means of screws 28.

Said front wheel 21 is journaled on a shaft 29, specifically at trunnions 30 thereof, and between the trunnions 30 and plates 27, double roller bearing structures 31 are interposed, the same being removable, and being located between the hanger members 32 of the fork 17, nuts 33 being screw threaded on such trunnions 30 outwardly thereof. The outer bearing members 34 are screw threaded to the trunnions 30, and the shaft 29 is thus rigidly mounted.

Said shaft, between the plates 27, has a ring enlargement or portion 35 through which an electric motor 36 passes, the electric motor being disposed to extend substantially equidistantly on opposite sides of the ring portion. Said ring portion has diametrically aligned openings 37 therein in which studs 38 are journaled and which studs at their inner ends as at 39, are screw threaded into the casing 40 of the said motor 36. The portion 35 and motor are constructed and arranged to enable slight oscillation or swinging of the motor 36 about the studs 38 as an axis for a purpose later to appear.

A ring gear 41 is bolted or screwed at 42 to the wall or hub 24, extending inwardly therefrom, and slightly at an angle. The main shaft of the motor 36 which is shown at 43 is disposed radially of the front wheel 21 and at one end has a gear member 44 keyed thereto and adapted at times to engage the gear member 41 to impart rotation to the front wheel.

It will be noted that while the gears 41 and 44 are shown as of the friction type, they may nevertheless be provided with teeth if desired.

Adjacent said gear 44, electromagnets 45 are mounted on an extension 46 of the motor frame 40. The electromagnets 45 are adapted to be energized at desired times and under appropriate control to have attraction for the metallic gear 41, in order that the gear 44 will be drawn into driving contact with the gear 41.

On another extension 47 of the motor casing 40, are electromagnets 48, adapted at times to be energized, to have attraction for the metallic gear 41, tending to arrest motion of the motor casing and to thereby brake the rotation of the wheel.

It will be noted that the magnets 48 preferably have non-magnetic plates 49 about the cores thereof, at the ends adjacent gear 41. The core of the magnets 45 may be adjusted through the manipulation of a screw 50.

Figure 8:
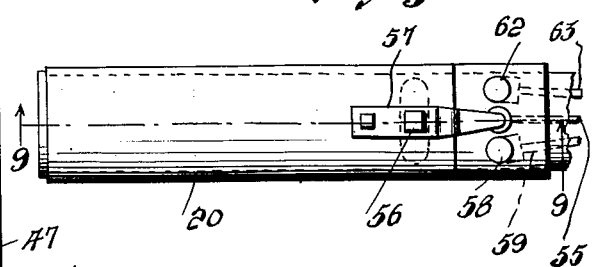
Figure 8 is a detail plan view of the right hand handle bar, partly broken away.

The electrical energy required to operate the motor 36 is preferably derived from primary or secondary electric batteries as at 51 mounted on a support 52 connected to parts of the frame 10 by means of clamps at 53 and 54, for example. One terminal of the battery 51 is grounded to the frame 10 and from the other terminal, a conductor 55 extends to a bolt 56 passing through the right hand portion of the handle bar 19 and grip 20, being appropriately insulated where necessary. Pivoted on the bolt 56 is a switch lever 57 shown in a neutral position in Figure 8. Such lever 57 may be moved into engagement with a contact 58 on the handle bar, from which a conductor 59 extends, passing to the motor through an opening 60 in one of the trunnions 30 and having a branch 61 extending to the solenoids 45 which at their other terminal are grounded to the frame.

The lever 57 is also movable into engagement with a contact 62 on the handle bar, from which a conductor 63, guided through the opening 60, passes to the solenoids 48, the other terminal of which is grounded to the frame.

It will be noted that spring members 65 pass through openings in the studs 38 and that at opposite ends, they are anchored to lugs 66 on the motor casing. As a result, the tension of the springs 65 normally urges the motor into a neutral position and both gear 44 and magnets 48 disengaged with gear 41.

As a result of the construction described, when the operator desires to propel the bicycle through the power of the motor 36, lever 57 is moved into engagement with contact 58, thereby energizing the motor and also the magnets 45, the latter attracting the gear 41 and moving gear 44 into driving contact therewith so that the continued operation of the motor 36, will rotate or drive the front wheel through the medium of the gears 44 and 41. When the lever 57 is moved to the position of Figure 8, the power is cut-off and the springs 65 restore the motor to the neutral position of Figure 3, whereupon, in order to brake the action of the wheel 21, lever 57 is engaged with contact 62, energizing the electro-magnets 48 which through their attractive action on the gear 41, effect the braking action on the motor. Subsequent return of the lever 57 to the neutral position of Figure 8, permits the springs 65 to restore the motor to normal position.

Various changes may be resorted to provided they fall within the spirit and scope of the invention.

I claim as my invention:

1. In a traction wheel for a vehicle of the class described, a rotatable hub member, a motor disposed within the hub member rotatable on an axis crossing the axis of the hub member and gearing between the hub member and motor, comprising an inwardly extending gear member on the hub member, the shaft of said motor being diametrically disposed and having a gear member on one end thereof engageable with the first gear member substantially in a plane crossing the axis of the hub member, and means journaling the motor in the hub member for bodily movement to engage and disengage said gears.

2. In a traction wheel for a vehicle of the class described, a rotatable hub member, a motor disposed within the hub member rotatable on an axis crossing the axis of the hub member and gearing between the hub member and motor, comprising an inwardly extending gear member on the hub member, the shaft of said motor being diametrically disposed and having a gear member on one end thereof engageable with the first gear member substantially in a plane crossing the axis of the hub member, and electrically operated means carried by the motor coacting with the first mentioned gear member to function as a brake, means journaling the motor in the hub member for bodily movement to engage and disengage said gears, and means normally urging said gears into disengagement.

3. In a wheel for a vehicle of the class described, a hub member, a motor disposed within the hub member and gearing between the hub member and motor, comprising an inwardly extending gear member on the hub member, the shaft of said motor being diametrically disposed and having a gear member on one end thereof engageable with the first gear member, means journaling the motor in the hub member for bodily movement to engage and disengage said gears, and electrically operable means carried by the motor co-acting with the first mentioned gear member to function as a brake.

4. In a wheel for a vehicle of the class described, a hub member, a motor disposed within the hub member and gearing between the hub member and motor, comprising an inwardly extending gear member on the hub member, the shaft of said motor being diametrically disposed and having a gear member on one end thereof engageable with the first gear member, means journaling the motor in the hub member for bodily movement to engage and disengage said gears, and electro-magnetic means carried by the motor to attract the first mentioned gear to urge the second mentioned gear into driving relation therewith.

5. In a wheel for a vehicle of the class described, a hub member, a motor disposed within the hub member and gearing between the hub member and motor, comprising an inwardly extending gear member on the hub member, the shaft of said motor being diametrically disposed and having a gear member on one end thereof engageable with the first gear member, means journaling the motor in the hub member for bodily movement to engage and disengage said gears, and electrically operable means carried by the motor co-acting with the first mentioned gear member to function as a brake, and extensions on said hub member and the casing of said motor mounting said brake and said electrically operable means.

6. In a wheel for a vehicle of the class described, a hub member, a motor disposed within the hub member and gearing between the hub member and motor, comprising an inwardly extending gear member on the hub member, the shaft of said motor being diametrically disposed and having a gear member on one end thereof engageable with the first gear member, plates at opposite ends of the hub member, a shaft having trunnions on which the plates are journaled, said shaft between the plates having a ring through which the motor passes with clearance, and means carried by the ring mounting the motor for limited pivotal movement.

THOMAS M. McDONALD.